US012421470B2

(12) United States Patent
Furukawa et al.

(10) Patent No.: US 12,421,470 B2
(45) Date of Patent: Sep. 23, 2025

(54) LUBRICANT COMPOSITION, TRANSFER DEVICE, AND IMAGE FORMING APPARATUS

(71) Applicant: FUJIFILM Business Innovation Corp., Tokyo (JP)

(72) Inventors: Masato Furukawa, Kanagawa (JP); Masayuki Seko, Kanagawa (JP); Daisuke Tanemura, Kanagawa (JP); Masato Ono, Kanagawa (JP); Iori Nishimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/664,694

(22) Filed: May 15, 2024

(65) Prior Publication Data

US 2025/0122440 A1 Apr. 17, 2025

(30) Foreign Application Priority Data

Oct. 11, 2023 (JP) ................................ 2023-176341

(51) Int. Cl.

| | |
|---|---|
| ***C10M 103/00*** | (2006.01) |
| ***C10M 145/04*** | (2006.01) |
| ***G03G 15/16*** | (2006.01) |
| *C10N 20/00* | (2006.01) |

(52) U.S. Cl.

CPC ........ *C10M 103/00* (2013.01); *C10M 145/04* (2013.01); *G03G 15/161* (2013.01); *C10M 2201/1053* (2013.01); *C10M 2209/04* (2013.01); *C10N 2020/091* (2020.05); *G03G 2215/1623* (2013.01); *G03G 2215/1661* (2013.01)

(58) Field of Classification Search

CPC ............. G03G 15/162; G03G 21/0011; G03G 9/0819; G03G 15/75

See application file for complete search history.

(56) References Cited

U.S. PATENT DOCUMENTS

| | | | |
|---|---|---|---|
| 5,812,919 A | 9/1998 | Takano et al. | |
| 2009/0028618 A1* | 1/2009 | Kabata | G03G 21/0011 399/346 |
| 2018/0373198 A1 | 12/2018 | Mizusawa et al. | |
| 2019/0373198 A1* | 12/2019 | Chang | H04N 25/633 |
| 2020/0379395 A1* | 12/2020 | Fukao | B65H 29/14 |
| 2022/0221806 A1* | 7/2022 | Kubo | G03G 15/1615 |
| 2023/0280680 A1 | 9/2023 | Tanaka et al. | |

FOREIGN PATENT DOCUMENTS

| | | |
|---|---|---|
| JP | H08-278707 A | 10/1996 |
| JP | 2011-039430 A | 2/2011 |
| JP | 2019-120877 A | 7/2019 |

OTHER PUBLICATIONS

Nov. 11, 2024 Extended Search Report issued in European Patent Application No. 24176098.2.

* cited by examiner

*Primary Examiner* — Jessica L Eley
(74) *Attorney, Agent, or Firm* — Oliff PLC

(57) ABSTRACT

A lubricant composition fed to an intermediate transfer belt in an intermediate transfer-type electrophotographic image forming method includes solid lubricant particles that are inorganic compound particles having an average size of 120 nm or less and a binder disposed on surfaces of the solid lubricant particles. The content of the binder is 0.01% by mass or more and 20.00% by mass or less of the amount of the lubricant composition.

20 Claims, 2 Drawing Sheets

LUBRICANT COMPOSITION, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2023-176341 filed Oct. 11, 2023.

BACKGROUND

(i) Technical Field

The present disclosure relates to a lubricant composition, a transfer device, and an image forming apparatus.

(ii) Related Art

Electrophotographic image forming apparatuses (e.g., a copying machine, a facsimile, and a printer) form an image by transferring a toner image formed on the surface of an image holding member onto the surface of a recording medium and fixing the toner image to the recording medium. When the toner image is transferred to a recording medium, for example, an intermediate transfer-type image forming apparatus that includes an intermediate transfer belt has been used. There has been attempt to feed a lubricant to an intermediate transfer belt in order to enhance transferability from the intermediate transfer belt to recording media.

For example, Japanese Unexamined Patent Application Publication No. 2011-039430 discloses an intermediate transfer belt for use in an electrophotographic image forming apparatus, the intermediate transfer belt including a substrate layer and a surface layer, the surface layer including a coat layer formed of a material including at least a binder resin and inorganic fine particles having a volume average size of 30 to 200 nm, the inorganic fine particles being disposed locally in the surface of the coat layer and fixed thereto.

Japanese Unexamined Patent Application Publication No. 2019-120877 discloses a solid lubricant that is to be applied to an image carrier included in an electrophotographic image forming apparatus, the solid lubricant being a mixture including a fatty acid metal salt and silicone resin particles, the silicone resin particles having a number average primary particle size of 10 nm or more and 250 nm or less.

SUMMARY

Aspects of non-limiting embodiments of the present disclosure relate to a lubricant composition that enhances the transferability of a toner from an intermediate transfer belt to a paper sheet having irregularities while having high feedability to the intermediate transfer belt, compared with a lubricant composition that includes only solid lubricant particles that are inorganic compound particles having an average size of more than 120 nm, a lubricant composition in which the content of a binder is less than 0.01% by mass of the amount of the lubricant composition, or a lubricant composition in which the content of a binder is more than 20% by mass of the amount of the lubricant composition, and a transfer device and an image forming apparatus that include the lubricant composition.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a lubricant composition fed to an intermediate transfer belt in an intermediate transfer-type electrophotographic image forming method, the lubricant composition including solid lubricant particles that are inorganic compound particles having an average size of 120 nm or less, and a binder disposed on surfaces of the solid lubricant particles, wherein a content of the binder is 0.01% by mass or more and 20.00% by mass or less of an amount of the lubricant composition.

BRIEF DESCRIPTION OF THE DRAWINGS

Exemplary embodiments of the present disclosure will be described in detail based on the following figures, wherein.

DETAILED DESCRIPTION

Figure 1:
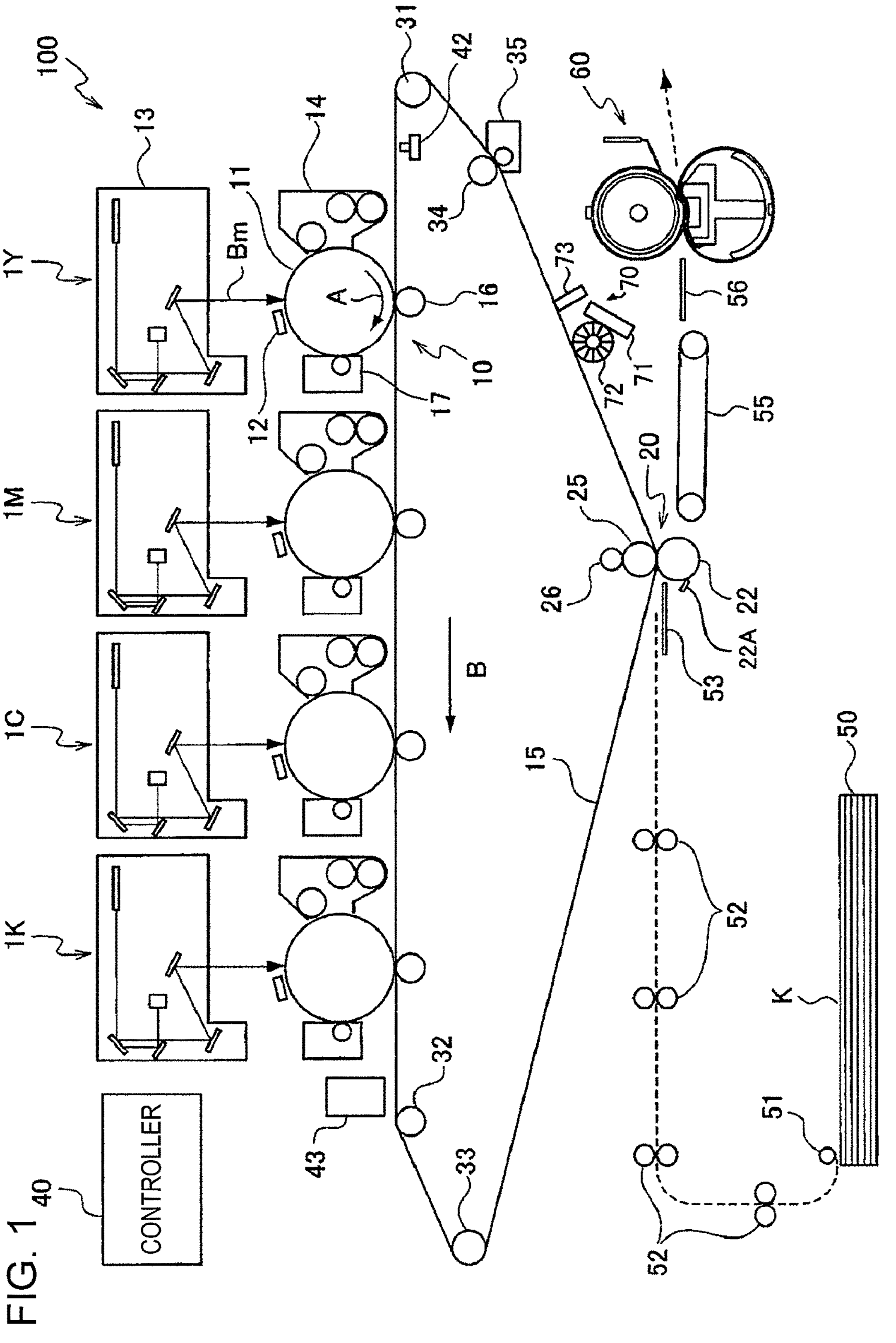
FIG. 1 is a schematic diagram illustrating an example of an image forming apparatus according to an exemplary embodiment.

Exemplary embodiments, which are examples of the present disclosure, are described below. The following description and Examples below are intended to be illustrative of the exemplary embodiments and not restrictive of the scope of the exemplary embodiments.

In the exemplary embodiments, when numerical ranges are described in a stepwise manner, the upper or lower limit of a numerical range may be replaced with the upper or lower limit of another numerical range, respectively. In the exemplary embodiments, the upper and lower limits of a numerical range may also be replaced with the values described in Examples below.

In the exemplary embodiments, the term "step" refers not only to an individual step but also to a step that is not distinguishable from other steps but achieves the intended purpose of the step.

In the exemplary embodiments, when an exemplary embodiment is described with reference to a drawing, the structure of the exemplary embodiment is not limited to the structure illustrated in the drawing. The sizes of the members illustrated in the attached drawings are conceptual and do not limit the relative relationship among the sizes of the members.

Each of the components described in the exemplary embodiments may include a plurality of types of substances that correspond to the component. In the exemplary embodiments, in the case where a composition includes a plurality of substances that correspond to a component of the composition, the content of the component in the composition is the total content of the plurality of substances in the composition unless otherwise specified.

Lubricant Composition

The lubricant composition according to the exemplary embodiment is a lubricant composition fed to an intermediate transfer belt used in an intermediate transfer-type electrophotographic image forming method. The lubricant composition includes solid lubricant particles that are inorganic compound particles having an average size of 120 nm or less and a binder disposed on the surfaces of the solid lubricant particles. The content of the binder is 0.01% by mass or more and 20.00% by mass or less of the amount of the lubricant composition.

The above-described lubricant composition according to the exemplary embodiment enhances the transferability of a toner from an intermediate transfer belt to a paper sheet having irregularities while having high feedability to the intermediate transfer belt. The reasons for this are not clear but considered as follows.

In an intermediate transfer-type image forming apparatus that includes an intermediate transfer belt with which a toner image formed on an image holding member is transferred to a recording medium, the transferability of the toner image to a paper sheet having irregularities which serves as a recording medium (i.e., a recording medium having surface irregularities, such as an embossed paper sheet; hereinafter, also referred to simply as "rough paper sheet") may become degraded. It is considered that the above issues occur because a discharge product generated when an electrostatic latent image is formed on the surface of an image holding member accumulates on the surface of an intermediate transfer belt during the repeated formation of images and, consequently, the adhesive force between the intermediate transfer belt and a toner is gradually increased. The toner transferability becomes particularly degraded at the edges of the recesses of a rough paper sheet because the force at which the rough paper sheet is pressed against the intermediate transfer belt at a position at which a toner image is transferred from the intermediate transfer belt (i.e., second transfer section) is reduced at the edges of the recesses.

In order to address the above issues, in this exemplary embodiment, inorganic compound particles having a size of 120 nm or less are used as solid lubricant particles, which are fed to an intermediate transfer belt and irregularities that are formed of the solid lubricant particles and have a height of 120 nm or less are created in the surface of the intermediate transfer belt. This reduces the area of a portion of the intermediate transfer belt which is brought into contact with the toner particles transferred to the intermediate transfer belt and the adhesive forces of the toner particles to the intermediate transfer belt. As a result, the transferability of a toner to a rough paper sheet, such as an embossed paper sheet, may be enhanced.

Furthermore, in this exemplary embodiment, a binder is disposed on the surfaces of the solid lubricant particles, and the content of the binder in the lubricant composition is 0.01% by mass or more. This enables particles of the lubricant composition to be bound to one another to form blocks before the lubricant composition is fed to an intermediate transfer belt (e.g., while the lubricant composition is stored in a feeding unit). Since the lubricant composition is in the form of blocks, it may be fed to an intermediate transfer belt in a suitable manner.

On the other hand, in this exemplary embodiment, the content of the binder included in the solid lubricant particles is 20% by mass or less. This allows the lubricant composition, the particles of which are bound to one another to form blocks before the lubricant composition is fed to an intermediate transfer belt (e.g., while the lubricant composition is stored in a feeding unit), to be readily crushed. In other words, the particles of the lubricant composition can be loosely bound to one another when the content of the binder included in the solid lubricant particles is adjusted to fall within the above range. Therefore, the blocks of the lubricant composition are crushed due to the impact given when the lubricant composition is fed to an intermediate transfer belt and, as a result, the lubricant composition is disposed on the intermediate transfer belt in particulate form (i.e., not in the form of blocks). This enables irregularities that are formed of the solid lubricant particles and have a height of 120 nm or less to be created in the surface of the intermediate transfer belt. Consequently, the transferability of a toner to a rough paper sheet, such as an embossed paper sheet, may be enhanced.

Details of the lubricant composition according to the exemplary embodiment are described below.

Solid Lubricant Particles

The lubricant composition according to the exemplary embodiment includes solid lubricant particles that are inorganic compound particles having an average size of 120 nm or less.

Average Particle Size

In this exemplary embodiment, inorganic compound particles having an average size of 120 nm or less are used as solid lubricant particles. Since the above average particle size is 120 nm or less, the transferability of a toner to a rough paper sheet, such as an embossed paper sheet, may be enhanced. The average size of the inorganic compound particles is preferably 115 nm or less and is more preferably 100 nm or less.

The lower limit for the average size of the inorganic compound particles is preferably, but not limited to, 20 nm or more, is more preferably 30 nm or more, and is further preferably 50 nm or more. Since the average size of the inorganic compound particles is 20 nm or more, the irregularities formed of the solid lubricant particles may be created in the surface of the intermediate transfer belt in a suitable manner. This reduces the area of a portion of the intermediate transfer belt which is brought into contact with the toner particles transferred to the intermediate transfer belt and consequently may enhance the transferability of a toner to a rough paper sheet.

Note that the average size of the inorganic compound particles is an average particle size measured when a binder is absent on the surfaces of the inorganic compound particles. The method for separating the binder from the surfaces of the inorganic compound particles is described later.

The method for measuring the average size of the inorganic compound particles is described below. First, an image of the inorganic compound particles that do not include a binder disposed on the surfaces thereof is taken with a scanning electron microscope. Then, 100 inorganic compound particles that do not overlap one another in the image are selected.

The equivalent area diameter of each of the particles is calculated from the projected area of the particle on the image. The arithmetic average of the equivalent area diameters of the particles is considered as an average particle size.

Type of Inorganic Compound Particles

Examples of the inorganic compound particles include silica particles ($SiO_2$), titania particles ($TiO_2$), alumina particles ($Al_2O_3$), cerium oxide particles, magnesium oxide particles, zinc oxide particles, and zirconia particles ($ZrO_2$).

Among these, silica particles are preferably used as inorganic compound particles.

Using silica particles as inorganic compound particles may enhance, in the case where an intermediate transfer belt is provided with a cleaning blade that is a member used for cleaning the outer peripheral surface of the intermediate transfer belt, a capability (i.e., abrasion performance) of the cleaning blade to scrape off a sediment (e.g., a discharge product) when the silica particles are built up at the portion of the intermediate transfer belt which is brought into contact with the cleaning blade to form a particle dam. This may limit the degradation of the transferability of a toner to a rough paper sheet.

Hydrophobization of Particles

The surfaces of the inorganic compound particles may be hydrophobized (hereinafter, this treatment is referred to as "surface hydrophobization treatment").

Using the inorganic compound particles that have been subjected to the surface hydrophobization treatment reduces the adhesive forces between a toner and the inorganic compound particles and consequently may make it easy to enhance toner transferability in early stages and the transferability of a toner to a rough paper sheet after the repeated formation of images.

Examples of the hydrophobizing agent used in the surface hydrophobization treatment include the organic silicon compounds known in the related art which have an alkyl group (e.g., methyl, ethyl, propyl, or butyl group). Specific examples thereof include silazane compounds (e.g., silane such compounds, as methyltrimethoxysilane, dimethyldimethoxysilane, trimethylchlorosilane, trimethylmethoxysilane, and octyltriethoxysilane, hexamethyldisilazane, and tetramethyldisilazane). The above hydrophobizing agents may be used alone or in combination of two or more.

The surface free energy of the inorganic compound particles is preferably 54 $mJ/m^2$ or less. When the surface free energy of the inorganic compound particles falls within the above range, the adhesive force of a toner to an intermediate transfer belt is reduced, and it becomes possible to maintain the transferability of a toner to a paper sheet having irregularities at a high level. In particular, it becomes possible to maintain the transferability of a toner to a paper sheet having irregularities at a high level particularly in the case where a high-speed image forming apparatus is used. The above surface free energy may be adjusted in accordance with the degree of the surface hydrophobization treatment of the inorganic compound particles, the selection of the hydrophobizing agent used, or the like.

The surface free energy of the inorganic compound particles is more preferably 45 $mJ/m^2$ or less and is further preferably 30 $mJ/m^2$ or less.

The surface free energy of the inorganic compound particles is measured by the following method.

On the basis of the OWRK method, using water and diiodomethane having known surface free energies, water is dropped onto the surface of a compact formed of the inorganic compound particles and the contact angle of water is measured. Diiodomethane is dropped onto the surface of a compact formed of a metal oxide, and the contact angle of the diiodomethane is measured. Subsequently, surface free energy ($mJ/m^2$) is calculated.

Binder

The lubricant composition according to the exemplary embodiment includes a binder disposed on the surfaces of the solid lubricant particles. The content of the binder in the lubricant composition is 0.01% by mass or more and 20% by mass or less.

Binder Content

The content of the binder is 0.01% by mass or more and 20.00% by mass or less of the total amount of the lubricant composition. Since the above binder content is 0.01% by mass or more of the amount of the lubricant composition, the lubricant composition may be fed to an intermediate transfer belt with suitable feedability. Since the above binder content is 20.00% by mass or less of the amount of the lubricant composition, the transferability of a toner to a rough paper sheet, such as an embossed paper sheet, may be enhanced.

The lower limit for the content of the binder in the lubricant composition is preferably 0.10% by mass or more and is more preferably 0.50% by mass or more. The upper limit for the content of the binder in the lubricant composition is preferably 15.00% by mass or less and is more preferably 10.00% by mass or less.

The method for measuring the content of the binder is described below. The lubricant composition is charged into a solvent (e.g., water or an organic solvent) in which the binder is soluble and the inorganic compound particles are not soluble. The resulting mixture is stirred in order to dissolve the binder in the solvent and thereby separate the binder from the mixture. Subsequently, the masses of the binder and the solid lubricant particles are measured, and the content of the binder is calculated.

Type of Binder

The binder may be a water-soluble binder. Note that the term "water-soluble" used herein means that the amount of the binder dissolved in 100 parts by mass of water at 25° C. is 5 parts by mass or more and is preferably 10 parts by mass or more.

A water-soluble binder may be used in consideration of environmental loads. Specifically, a water-soluble binder may be used to eliminate the need to use an organic solvent when the water-soluble binder is sprayed onto the surfaces of the solid lubricant particles and drying is subsequently performed in the surface treatment of the solid lubricant and thereby reduce the environmental loads.

Examples of the water-soluble binder include cellulose derivatives, such as polyvinyl alcohol, silanol-modified polyvinyl alcohol, methyl cellulose, carboxymethyl cellulose, and hydroxyethyl cellulose; starch derivatives, such as oxidized starch and etherified starch; and polypropylene glycol and polyethylene glycol.

Among the above binders, polyvinyl alcohol may be used to reduce the intermolecular interaction between the binder and the surface-treated silica particles.

Treatment Method

In the lubricant composition, the binder is disposed on the surfaces of the solid lubricant particles. The method for applying the binder onto the surfaces of the solid lubricant particles is described below.

First, the binder is dissolved in water to form an aqueous solution of the binder. The aqueous solution of the binder is sprayed onto the surfaces of the solid lubricant particles by spray coating. Subsequently, air drying is performed to vaporize moisture. Hereby, surface-treated solid lubricant particles are prepared. For performing spraying, any spray known in the related art may be used; the splay is not limited.

Physical Properties of Lubricant Composition

The Martens hardness of the lubricant composition is preferably 3 $N/mm^2$ or more and 30 $N/mm^2$ or less. The above Martens hardness being 3 $N/mm^2$ or more means that the lubricant composition can be easily crushed, that is, the particles of the lubricant composition are loosely bound to one another before they are fed to an intermediate transfer belt (e.g., while they are stored in a feeding unit). Therefore, the blocks of the lubricant composition can be easily crushed due to the impacts given when the lubricant composition is fed to an intermediate transfer belt. This makes it easy to enhance the transferability of a toner to a rough paper sheet. On the other hand, the above Martens hardness being 30 $N/mm^2$ or less means that the particles of the lubricant composition can be easily bound to one another to form blocks. Therefore, the particles of the lubricant composition are likely to bind to one another to form blocks before they are fed to an intermediate transfer belt (e.g., while they are stored in a feeding unit). This may enhance the feedability with which the lubricant composition is fed to an intermediate transfer belt.

The lower limit for the Martens hardness of the lubricant composition is preferably 4 $N/mm^2$ or more and is more preferably 5 $N/mm^2$ or more. The upper limit for the Martens hardness of the lubricant composition is preferably 20 $N/mm^2$ or less and is more preferably 15 $N/mm^2$ or less.

Note that the Martens hardness of the lubricant composition is determined after the particles of the lubricant composition have been bound to one another to form blocks.

The method for determining the Martens hardness of the lubricant composition is described below.

First, the method for preparing a measurement sample composed of particles of the lubricant composition which are bonded to one another to form blocks is described below. A measurement sample is prepared by compression-molding the solid lubricant particles prepared by the method for treating the surfaces of the solid lubricant particles, which is described in the section "Treatment Method" above, using a tablet molding machine.

The Martens hardness of the measurement sample is measured.

Martens hardness, which is the load necessary to create a dent having a certain depth, is an index of the degree of hardness. The measurement sample is placed on a measuring device "Dynamic Ultra Micro Hardness Tester DUH-211" produced by Shimadzu Corporation, and the load at which a scratch having a width of 0.01 mm is formed on the measurement sample is measured using a pyramid-shaped diamond indenter in which the angle between the opposite faces is 90 degrees. Thus, the Martens hardness of the lubricant composition is determined.

Note that the measurement of Martens hardness is done under the following conditions: vertex angle of trigonal pyramid indenter: 115°, load: 0.5 mN, loading rate: 0.03 mN/sec, and load maintenance time: 5 seconds.

Transfer Device

A transfer device according to an exemplary embodiment of the present disclosure is described below.

The transfer device according to this exemplary embodiment includes an intermediate transfer belt having a surface onto which a toner image is transferred, a first transfer unit including a first transfer member that transfers a toner image formed on a surface of an image holding member onto the surface of the intermediate transfer belt as first transfer, a second transfer unit including a second transfer member arranged to contact with the surface of the intermediate transfer belt, the second transfer member transferring the toner image transferred on the surface of the intermediate transfer belt onto the surface of a recording medium as second transfer, a cleaning unit including a cleaning blade that cleans the surface of the intermediate transfer belt, and a lubricant feeding unit arranged to contact with the surface of the intermediate transfer belt, the lubricant feeding unit feeding a lubricant composition onto the surface of the intermediate transfer belt. Furthermore, the lubricant composition according to the above-described exemplary embodiment of the present disclosure is used as a lubricant composition.

Structure of Intermediate Transfer Belt

The intermediate transfer belt includes a belt main body and inorganic compound particles that are disposed on the surface (i.e., outer peripheral surface) of the belt main body and serve as a solid lubricant.

The belt main body may be a single-layer body consisting of a resin substrate layer or a multilayer body that includes a resin substrate layer.

Examples of the multilayer body that includes a resin substrate layer include a multilayer body that includes a resin substrate layer and an elastic layer disposed on the outer peripheral surface of the resin substrate layer, a multilayer body that includes a resin substrate layer and a resin layer disposed on the inner peripheral surface of the resin substrate layer, and a multilayer body that includes a resin substrate layer, an elastic layer disposed on the outer peripheral surface of the resin substrate layer, and a resin layer disposed on the inner peripheral surface of the resin substrate layer.

Note that the elastic layer disposed on the outer peripheral surface of the resin substrate layer and the resin layer disposed on the inner peripheral surface of the resin substrate layer may be selected from the layers known in the related art as components of intermediate transfer belts.

Resin Substrate Layer

The resin substrate layer includes, for example, a resin and a conductant agent. The resin substrate layer may include other components known in the related art as needed.

Resin

Examples of the resin include a polyimide (PI) resin, a polyamide imide (PAI) resin, an aromatic polyether ketone resin (e.g., aromatic polyether ether ketone resin), a polyphenylene sulfide (PPS) resin, a polyether imide (PEI) resin, a polyester resin, a polyamide resin, and a polycarbonate resin.

The resin is preferably a polyimide-based resin (i.e., a resin including a structural unit having an imide linkage), is more preferably a polyimide resin or a polyamide imide resin, and is further preferably a polyimide resin in consideration of mechanical strength and the dispersibility of the conductant agent.

The polyimide resin may be, for example, a polyimide resin produced by imidization of a polyamic acid (i.e., precursor of the polyimide resin) produced by polymerization of a tetracarboxylic dianhydride with a diamine compound.

Examples of the polyimide resin include a resin having the structural unit represented by General Formula (I) below.

(I)

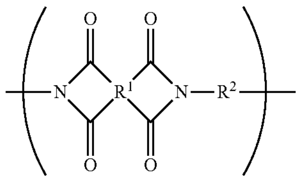

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group including an aromatic group and an aliphatic group, and the above groups that include a substituent. Specific examples of the tetravalent organic group include a residue of the tetracarboxylic dianhydride described below.

Examples of the divalent organic group represented by $R^2$ include an aromatic group, an aliphatic group, a cyclic aliphatic group, a group including an aromatic group and an aliphatic group, and the above groups that include a substituent. Specific examples of the divalent organic group include a residue of the diamine compound described below.

Specific examples of the tetracarboxylic dianhydride used as a raw material for the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl) sulfonic dianhydride, perylene-3,4,9,10-tetracarboxylic dianhydride, bis(3,4-dicarboxyphenyl) ether dianhydride, and ethylenetetracarboxylic dianhydride.

Specific examples of the diamine compound used as a raw material for the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl) toluene, bis(p-β-amino-tert-butylphenyl) ether, bis(p-β-methyl-8-aminophenyl) benzene, bis-p-(1,1-dimethyl-5-amino-pentyl) benzene, 1-isopropyl-2,4-m-phenylenediamine, m-xylylenediamine, p-xylylenediamine, di (p-aminocyclohexyl) methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminoprpoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl] propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

Examples of the polyamide imide resin include a resin having a repeating unit including an imide linkage and an amide linkage.

Specific examples of the polyamide imide resin include a polymer formed by polymerization of a trivalent carboxylic acid compound (i.e., tricarboxylic acid) having an acid anhydride group with a diisocyanate or diamine compound.

Examples of the tricarboxylic acid include trimellitic anhydride and derivatives thereof. The tricarboxylic acid may be used in combination with a tetracarboxylic dianhydride, an aliphatic dicarboxylic acid, an aromatic dicarboxylic acid, or the like.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has a structure analogous to that of the above-described isocyanate and includes amino groups instead of isocyanato groups.

The content of the resin in the resin substrate layer is preferably 60% by mass or more and 95% by mass or less, is more preferably 70% by mass or more and 95% by mass or less, and is further preferably 75% by mass or more and 90% by mass or less in consideration of mechanical strength, the adjustment of volume resistivity, and the like.

Conductant Agent

Examples of the conductant agent include a conductive (e.g., having a volume resistivity of less than $10^7$ Ω·cm, the same applies hereinafter) powder and a semiconductive (e.g., having a volume resistivity of $10^7$ Ω·cm or more and $10^{13}$ Ω·cm or less, the same applies hereinafter) powder.

Specific examples of the conductant agent include, but are not limited to, carbon black, metals (e.g., aluminum and nickel), metal oxides (e.g., yttrium oxide and tin oxide), and ionic conductive substances (e.g., potassium titanate and LiCl).

The type of the conductant agent is selected in accordance with the intended use. The conductant agent is preferably carbon black.

Examples of the carbon black include Ketjenblack, oil furnace black, channel black, and acetylene black. The carbon black particles may be carbon black particles the surfaces of which have been treated (hereinafter, such carbon black particles may be referred to as "surface treated carbon black particles").

The surface treated carbon black particles are produced by attaching a carboxyl group, a quinone group, a lactone group, a hydroxyl group, or the like to the surfaces of the carbon black particles. Examples of a method for performing the surface treatment include an air oxidation method in which carbon black particles are contacted with air in a high temperature atmosphere; a method in which carbon black particles are caused to react with a nitrogen oxide or ozone at normal temperature (e.g., 22° C.); and a method in which carbon black particles are subjected to air oxidation in a high temperature atmosphere and subsequently oxidized with ozone at low temperatures.

The average size of the carbon black particles is preferably 2 nm or more and 40 nm or less, is more preferably 8 nm or more and 20 nm or less, and is further preferably 10 nm or more and 15 nm or less in consideration of dispersibility, mechanical strength, volume resistivity, film formability, and the like.

The average size of the particles of the conductant agent (in particular, carbon black) is measured by the following method.

First, a sample having a thickness of 100 nm is taken from the resin substrate layer with a microtome. The sample is observed with a transmission electron microscope (TEM). For each of 50 conductant agent particles, the diameter of a circle having an area equal to the projected area of the conductant agent particle, that is, the equivalent circle diameter of the conductant agent particle, is calculated as the size of the conductant agent particle. The average of the sizes of the 50 conductant agent particles is considered as the average size of the conductant agent particles.

The content of the conductant agent in the resin substrate layer is preferably 10% by mass or more and 50% by mass or less, is more preferably 12% by mass or more and 40% by mass or less, and is further preferably 15% by mass or more and 30% by mass or less in consideration of mechanical strength and volume resistivity.

Other Components

Examples of the other components include a filler that increases mechanical strength; an antioxidant that reduces the thermal degradation of the belt; a surfactant that enhances flowability; and a heat aging inhibitor.

In the case where the resin substrate layer includes the other components, the content of the other components in the resin substrate layer is preferably more than 0% by mass and 10% by mass or less, is more preferably more than 0% by mass and 5% by mass or less, and is further preferably more than 0% by mass and 1% by mass or less.

Thickness of Resin Substrate Layer

The thickness of the resin substrate layer is preferably 60 μm or more and 120 μm or less and is more preferably 80 μm or more and 120 μm or less in consideration of mechanical strength.

The thickness of the resin substrate layer is measured in the following manner.

Specifically, a cross section of the resin substrate layer in the thickness direction is observed with an optical microscope or a scanning electron microscope. The thickness of the layer that is to be analyzed is measured at ten positions, and the average thereof is considered as the thickness of the layer.

Volume Resistivity of Intermediate Transfer Belt

The common logarithm of the volume resistivity of the intermediate transfer belt which is measured when a voltage of 500 V is applied to the intermediate transfer belt for 10 seconds is preferably 9.0 log Ω·cm or more and 13.5 log Ω·cm or less, is more preferably 9.5 log Ω·cm or more and 13.2 log Ω·cm or less, and is particularly preferably 10.0 log Ω·cm or more and 12.5 log Ω·cm or less in consideration of transferability.

The volume resistivity of the intermediate transfer belt which is measured when a voltage of 500 V is applied to the intermediate transfer belt for 10 seconds is determined by the following method.

The volume resistivity (log Ω·cm) of the intermediate transfer belt is measured using a micro current meter "R8430A" produced by Advantest Corporation as a resistance meter and a UR probe produced by Mitsubishi Chemical Analytech Co., Ltd. as a probe at the center and both edges of the intermediate transfer belt in the width direction for each of 6 positions spaced at regular intervals in the circumferential direction, that is, 18 positions in total, with an applied voltage of 500 V, a voltage application time of 10 seconds, and a pressure of 1 kgf. The average of the resistivity values measured is calculated. The above measurement is conducted at 22° C. and 55% RH.

Surface Resistivity of Intermediate Transfer Belt

The common logarithm of the surface resistivity of the intermediate transfer belt which is measured when a voltage of 500 V is applied to the outer peripheral surface of the intermediate transfer belt for 10 seconds is preferably 10.0 log Ω/sq. or more and 15.0 log Ω/sq. or less, is more preferably 10.5 log Ω/sq. or more and 14.0 log Ω/sq. or less, and is particularly preferably 11.0 log Ω/sq. or more and 13.5 log Ω/sq. or less in consideration of the transferability to a rough paper sheet.

The unit of surface resistivity "log Ω/sq." expresses surface resistivity in terms of the logarithm of resistance value per unit area and is denoted also as, for example, log (Q/sq.), log Ω/square, or log Ω/□.

The surface resistivity of the intermediate transfer belt which is measured when a voltage of 500 V is applied to the outer peripheral surface of the intermediate transfer belt for 10 seconds is determined by the following method.

The surface resistivity (log Ω/sq.) of the outer peripheral surface of the intermediate transfer belt is measured using a micro current meter "R8430A" produced by Advantest Corporation as a resistance meter and a UR probe produced by Mitsubishi Chemical Analytech Co., Ltd. as a probe at the center and both edges of the outer peripheral surface of the intermediate transfer belt in the width direction for each of 6 positions spaced at regular intervals in the circumferential direction, that is, 18 positions in total, with an applied voltage of 500 V, a voltage application time of 10 seconds, and a pressure of 1 kgf. The average of the resistivity values measured is calculated. The above measurement is conducted at 22° C. and 55% RH.

Method for Producing Intermediate Transfer Belt

A method for producing the intermediate transfer belt according to this exemplary embodiment includes, for example, a step of preparing a belt main body and a step of applying inorganic compound particles onto the outer peripheral surface of the belt main body, the inorganic compound particles serving as a solid lubricant.

In the step of preparing a belt main body, a belt main body is prepared using any of the methods for producing intermediate transfer belts which are known in the related art.

Examples of the step of application of inorganic compound particles include the steps (1), (2), and (3) below. Among these, the step (1) may be used.

(1) a feeding member is brought into contact with a molded body formed of the inorganic compound particles to scrape off a part of the inorganic compound particles, and the scraped inorganic compound particles are fed onto the surface of the belt main body.

(2) a molded body formed of the inorganic compound particles is pressed against to the intermediate transfer belt (i.e., belt main body) directly so as to be worn and, thereby, the inorganic compound particles are fed onto the surface of the belt main body.

(3) an appropriate amount of the inorganic compound particles in powdery form are loaded on a feeding member, such as a roller, and the inorganic compound particles loaded on the feeding member are fed onto the surface of the belt main body.

Transfer Device

First Exemplary Embodiment

A transfer device according to a first exemplary embodiment includes an intermediate transfer belt having a surface (i.e., an outer peripheral surface) onto which a toner image is transferred; a first transfer unit including a first transfer member that transfers a toner image formed on the surface of an image holding member onto the surface of the intermediate transfer belt as first transfer; a second transfer unit including a second transfer member arranged to contact with the surface of the intermediate transfer belt, the second transfer member transferring the toner image transferred on the surface of the intermediate transfer belt onto the surface of a recording medium as second transfer; and a cleaning unit including a cleaning blade that cleans the surface of the intermediate transfer belt. Furthermore, the intermediate transfer belt according to the above-described exemplary embodiment is used as an intermediate transfer belt.

The transfer device according to the first exemplary embodiment is capable of maintaining the transferability of a toner to a paper sheet having irregularities at a high level.

In the first transfer unit, the first transfer member is arranged to face the image holding member across the intermediate transfer belt. In the first transfer unit, the first transfer member applies a voltage having a polarity opposite to the polarity in which the toner is charged to the intermediate transfer belt. This causes the toner image to be first-transferred onto the surface of the intermediate transfer belt.

In the second transfer unit, the second transfer member is disposed on a side of the intermediate transfer belt on which the toner image is held. The second transfer unit includes, for example, in addition to the second transfer member, a backing member disposed on a side of the intermediate transfer belt which is opposite to the side on which the toner image is held. In the second transfer unit, the intermediate transfer belt and a recording medium are sandwiched between the second transfer member and the backing member and a transfer electric field is formed consequently. This causes the toner image present on the intermediate transfer belt to be second-transferred to the recording medium.

The second transfer member may be a second transfer roller or a second transfer belt. The backing member is, for example, a backing roller.

In the cleaning unit, the cleaning blade is disposed on a side of the intermediate transfer belt on which a toner image is held. The cleaning unit includes, for example, in addition to the cleaning blade, a backing member disposed on a side of the intermediate transfer belt which is opposite to the side on which a toner image is held. In the cleaning unit, for example, while the intermediate transfer belt is sandwiched between the cleaning blade and the backing member, the surface of the intermediate transfer belt is cleaned with the cleaning blade.

The transfer device according to this exemplary embodiment may be a transfer device that transfers a toner image onto the surface of a recording medium with a plurality of intermediate transfer belts. That is, the transfer device may be, for example, a transfer device that first-transfers a toner image from an image holding member to a first intermediate transfer belt, second-transfers the toner image from the first intermediate transfer belt to a second intermediate transfer belt, and third-transfers the toner image from the second intermediate transfer belt to a recording medium.

At least one of the intermediate transfer belts included in the above transfer device is the intermediate transfer belt according to the above-described exemplary embodiment.

Second Exemplary Embodiment

A transfer device according to a second exemplary embodiment includes an intermediate transfer belt having a surface onto which a toner image is transferred, a first transfer unit including a first transfer member that transfers a toner image formed on the surface of an image holding member onto the surface of the intermediate transfer belt as first transfer, a second transfer unit including a second transfer member arranged to contact with the surface of the intermediate transfer belt, the second transfer member transferring the toner image transferred on the surface of the intermediate transfer belt onto the surface of a recording medium as second transfer, a cleaning unit including a cleaning blade that cleans the surface of the intermediate transfer belt, and an inorganic compound particle feeding unit that is arranged to contact with the surface of the intermediate transfer belt and feeds inorganic compound particles that serve as a solid lubricant onto the surface of the intermediate transfer belt.

The transfer device according to the second exemplary embodiment is capable of maintaining the transferability of a toner to a paper sheet having irregularities at a high level.

In the transfer device according to the second exemplary embodiment, for example, the inorganic compound particle feeding unit is disposed downstream of the second transfer unit in the direction of rotation of the intermediate transfer belt and upstream of the cleaning unit in the direction of rotation of the intermediate transfer belt.

The inorganic compound particle feeding unit may include, for example, a molded body formed of inorganic compound particles used as a solid lubricant and an inorganic compound particle feeding member (this corresponds to the step (1) described above).

Examples of the molded body formed of inorganic compound particles include inorganic compound particles compacted into a solid together with a binder resin and a molded body formed by compression molding of inorganic compound particles. Examples of the shape of the molded body include rod-like and plate-like (i.e., blade-like).

Examples of the inorganic compound particle feeding member include a rotary brush and a rubber roller. Among these, a rotary brush may be used. The rotary brush or rubber roller is brought into contact with the molded body of inorganic compound particles while being rotated to scrape off a part of the inorganic compound particles, and the scraped inorganic compound particles are fed onto the surface of the intermediate transfer belt.

Alternatively, in the inorganic compound particle feeding unit, for example, a molded body of inorganic compound particles may be pressed against to the intermediate transfer belt (i.e., belt main body) directly (this corresponds to the step (2) described above). As a result of the molded body of inorganic compound particles being pressed against the intermediate transfer belt and worn, the inorganic compound particles are fed onto the surface of the belt main body.

The structure of the transfer device according to the second exemplary embodiment is the same as that of the transfer device according to the first exemplary embodiment, except for the inorganic compound particle feeding unit.

Image Forming Apparatus

An image forming apparatus according to an exemplary embodiment includes a toner image formation device that forms a toner image on the surface of an image holding member and a transfer device that transfers the toner image formed on the surface of the image holding member onto the surface of a recording medium. The transfer device is the transfer device according to the above-described exemplary embodiment of the present disclosure.

An example of the toner image formation device is a device that includes an image holding member, a charging unit that charges the surface of the image holding member, an electrostatic latent image formation unit that forms an electrostatic latent image on the charged surface of the image holding member, and a developing unit that develops the electrostatic latent image formed on the surface of the image holding member using a developer including a toner to form a toner image.

The image forming apparatus according to this exemplary embodiment may be implemented as any of the following known image forming apparatuses: an image forming apparatus that includes a fixing unit that fixes the toner image transferred on the surface of the recording medium; an image forming apparatus that includes a cleaning unit that cleans the surface of the image holding member after the toner image has been transferred and before the image holding member is charged; an image forming apparatus that includes an erasing unit that irradiates, with erasing light, the surface of the image holding member after the toner image has been transferred and before the image holding member is charged in order to erase charge; and an image forming apparatus that includes an image holding member-heating member that heats the image holding member in order to lower the relative temperature.

The image forming apparatus according to this exemplary embodiment may be either a dry-developing image forming apparatus or a wet-developing image forming apparatus in which a liquid developer is used for developing images.

In the image forming apparatus according to this exemplary embodiment, for example, a portion including the image holding member may have a cartridge structure, that is, may be a process cartridge, which is detachably attachable to the image forming apparatus. The process cartridge may be, for example, a process cartridge that includes the toner image formation device and the transfer device.

An example of the image forming apparatus according to the exemplary embodiment is described below with reference to the attached drawings. Note that the image forming apparatus according to the exemplary embodiment is not limited to this. Only the components illustrated in the drawings are described below, and the descriptions of the other components are omitted.

The example of the image forming apparatus described below with reference to the drawings is an image forming apparatus that includes the transfer device according to the second exemplary embodiment. In the case where an image forming apparatus includes the transfer device according to the first exemplary embodiment, the transfer device may include, but does not necessarily include, the solid lubricant feeding unit.

Image Forming Apparatus

FIG. 1 is a schematic diagram illustrating the image forming apparatus according to the exemplary embodiment.

An image forming apparatus 100 according to the exemplary embodiment is, for example, an intermediate-transfer image forming apparatus illustrated in FIG. 1, which is commonly referred to as a tandem image forming apparatus. The image forming apparatus 100 includes a plurality of image forming units 1Y, 1M, 1C, and 1K (examples of a toner image formation device) that form yellow (Y), magenta (M), cyan (C), and black (K) toner images by an electrophotographic system; a first transfer section 10 in which the yellow, magenta, cyan, and black toner images formed by the image forming units 1Y, 1M, 1C, and 1K are sequentially transferred (first transfer) to an intermediate transfer belt 15; a second transfer section 20 in which the superimposed toner images transferred on the intermediate transfer belt 15 are collectively transferred (second transfer) to a paper sheet K; and a fixing unit 60 that fixes the image transferred on the paper sheet K by second transfer to the paper sheet K. The image forming apparatus 100 also includes a controller 40 that controls the operation of each of the devices and the sections.

Each of the image forming units 1Y, 1M, 1C, and 1K included in the image forming apparatus 100 includes a photosensitive member 11 (an example of the image holding member) that rotates in the direction of the arrow A, which holds a toner image formed on the surface.

The photosensitive member 11 is provided with a charger 12 (an example of the charging unit) and a laser exposure machine 13 (an example of the latent image forming unit) which are disposed on the periphery of the photosensitive member 11. The charger 12 charges the photosensitive member 11. The laser exposure machine 13 writes an electrostatic latent image on the photosensitive member 11 (in FIG. 1, an exposure beam is denoted with Bm).

The photosensitive member 11 is also provided with a developing machine 14 (an example of the developing unit) and a first transfer roller 16 which are disposed on the periphery of the photosensitive member 11. The developing machine 14 includes a yellow, magenta, cyan, or black toner and visualizes the electrostatic latent image formed on the photosensitive member 11 with the toner. The first transfer roller 16 transfers the yellow, magenta, cyan, or black toner image formed on the photosensitive member 11 to the intermediate transfer belt 15 in the first transfer section 10.

The photosensitive member 11 is further provided with a photosensitive member cleaner 17 disposed on the periphery of the photosensitive member 11. The photosensitive member cleaner 17 removes toner particles remaining on the photosensitive member 11. The above-described electrophotographic devices, that is, the charger 12, the laser exposure machine 13, the developing machine 14, the first transfer roller 16, and photosensitive member cleaner 17, are sequentially arranged on the periphery of the photosensitive member 11 in the direction of the rotation of the photosensitive member 11. The image forming units 1Y, 1M, 1C, and 1K are arranged in a substantially linear manner in the order of yellow (Y), magenta (M), cyan (C), and black (K) in the direction of the rotation of the intermediate transfer belt 15.

The intermediate transfer belt 15 is driven in a circulatory manner (i.e., rotated), by various types of rollers at an intended speed in the direction of the arrow B illustrated in FIG. 1. The above rollers include a driving roller 31 that is driven by a highly-constant-speed motor (not illustrated) and rotates the intermediate transfer belt 15; a support roller 32 that supports the intermediate transfer belt 15 that extends in a substantially linear manner in the direction in which the photosensitive members 11 are arranged; a tension roller 33 that applies tension to the intermediate transfer belt 15 and serves as a correction roller that prevents meandering of the intermediate transfer belt 15; a backing roller 25 disposed in the second transfer section 20; and a cleaning backing roller 34 disposed on a cleaning section in which toner particles remaining on the intermediate transfer belt 15 are scraped off.

The first transfer section 10 is constituted by first transfer rollers 16 that are arranged to face the respective photosensitive members 11 across the intermediate transfer belt 15. The first transfer rollers 16 are arranged to be in pressure contact with the photosensitive members 11 with the intermediate transfer belt 15 interposed between the first transfer rollers 16 and the photosensitive members 11. The first transfer rollers 16 are supplied with a voltage (first transfer bias) having a polarity opposite to the polarity (negative; the same applies hereinafter) of charged toner particles. Accordingly, toner images formed on the photosensitive members 11 are electrostatically attracted to the intermediate transfer belt 15 sequentially to form superimposed toner images on the intermediate transfer belt 15.

The second transfer section 20 is constituted by the backing roller 25 and a second transfer roller 22 disposed on a side of the intermediate transfer belt 15 on which the toner image is held.

The backing roller 25 has a surface resistivity of $1\times10^7$ Ω/□ or more and $1\times10^{10}$Ω/□ or less. The degree of hardness of the backing roller 25 is set to, for example, 70° ("ASKER C" produced by KOBUNSHI KEIKI CO., LTD.; the same applies hereinafter). The backing roller 25 is disposed on the rear surface-side of the intermediate transfer belt 15 and serves as a counter electrode for the second transfer roller 22. The backing roller 25 is provided with a power supplying roller 26 made of a metal, through which a second transfer bias is applied in a consistent manner.

The second transfer roller 22 is a hollow cylindrical roller having a volume resistivity of $10^{7.5}$ Ω·cm or more and $10^{8.5}$ Ω·cm or less. The second transfer roller 22 is arranged to be in pressure contact with the backing roller 25 with the intermediate transfer belt 15 interposed between the second transfer roller 22 and the backing roller 25. The second transfer roller 22 is grounded. A second transfer bias is formed between the second transfer roller 22 and the backing roller 25. Accordingly, the toner image is second-transferred to a paper sheet K transported to the second transfer section 20.

An intermediate transfer belt cleaning member 35 is disposed on the intermediate transfer belt 15 at a position downstream of the second transfer section 20 such that the distance between the intermediate transfer belt cleaning member 35 and the intermediate transfer belt 15 can be changed. The intermediate transfer belt cleaning member 35 removes toner particles and paper dust particles that remain on the intermediate transfer belt 15 subsequent to the second transfer and cleans the surface of the intermediate transfer belt 15. An example of the intermediate transfer belt cleaning member 35 is a cleaning roller. Alternatively, a cleaning blade may be used.

A second transfer roller cleaning member 22A is disposed on the second transfer roller 22 at a position downstream of the second transfer section 20. The second transfer roller cleaning member 22A removes toner particles and paper dust particles that remain on the second transfer roller 22 subsequent to the second transfer and cleans the surface of the second transfer roller 22. An example of the second transfer roller cleaning member 22A is a cleaning blade. Alternatively, a cleaning roller may be used.

The intermediate transfer belt 15 is provided with an inorganic compound particle feeding unit 70 disposed downstream of the second transfer section 20 and upstream of the intermediate transfer belt cleaning member 35. The inorganic compound particle feeding unit 70 feeds inorganic compound particles used as a solid lubricant.

The inorganic compound particle feeding unit 70 includes a molded body 71 formed of inorganic compound particles, an inorganic compound particle feeding member 72 with which a part of the molded body of inorganic compound particles is scraped off and the scraped inorganic compound particles are fed onto the surface of the intermediate transfer belt 15, and a sliding member 73 arranged to slide over the intermediate transfer belt 15 and rub the surface of the intermediate transfer belt 15 with the inorganic compound particles so as to form a coating composed of the inorganic compound particles.

The structure including the intermediate transfer belt 15, the first transfer roller 16, the second transfer roller 22, the intermediate transfer belt cleaning member 35, and the inorganic compound particle feeding unit 70 corresponds to an example of the transfer device.

Figure 2:
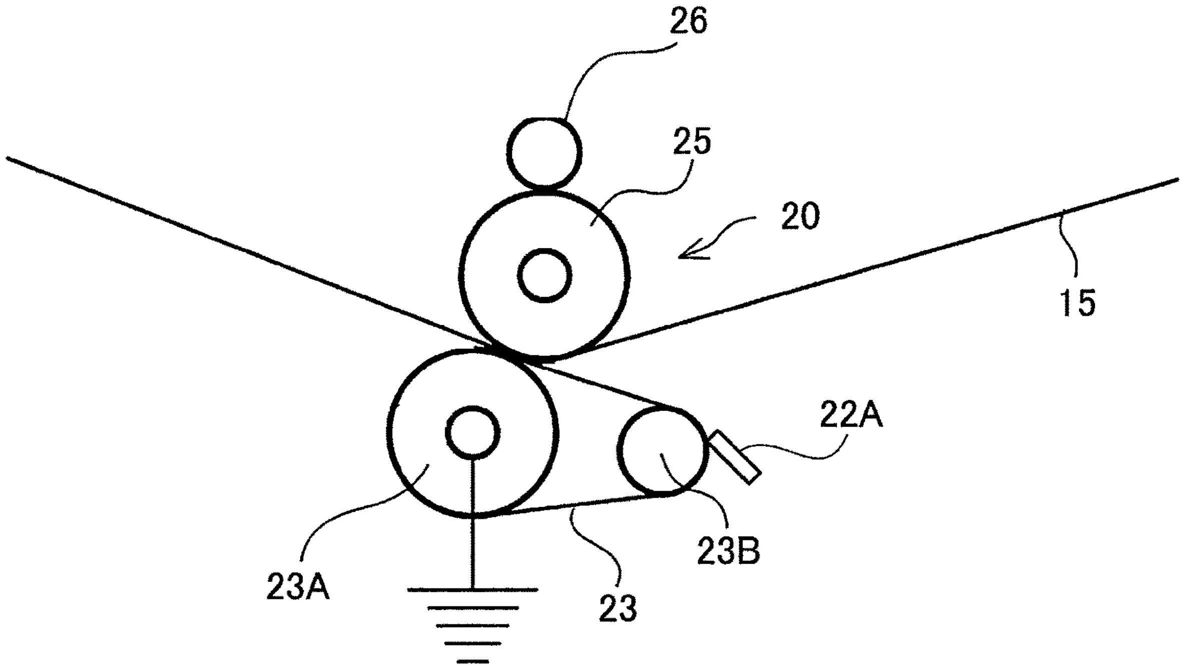
FIG. 2 is a schematic diagram illustrating the periphery of a second transfer section included in another example of the image forming apparatus according to the exemplary embodiment.

The image forming apparatus 100 may include a second transfer belt (an example of the second transfer member) instead of the second transfer roller 22. Specifically, the image forming apparatus 100 may include a second transfer unit that includes a second transfer belt 23, a driving roller 23A arranged to face the backing roller 25 across the intermediate transfer belt 15 and the second transfer belt 23, and an idler roller 23B that enables, together with the driving roller 23A, the second transfer belt 23 to lay across in a tensioned state as illustrated in FIG. 2.

A reference sensor (home position sensor) 42 is disposed upstream of the yellow image forming unit 1Y. The reference sensor (home position sensor) 42 generates a reference signal used as a reference to determine the timings at which images are formed in the image forming units 1Y, 1M, 1C, and 1K. An image density sensor 43 is disposed downstream of the black image forming unit 1K. The image density sensor 43 is used for adjusting image quality. The reference sensor 42 generates the reference signal upon recognizing a mark disposed on the back side of the intermediate transfer belt 15. Upon recognizing the reference signal, the controller 40 sends a command to the image forming units 1Y, 1M, 1C, and 1K. Each of the image forming units 1Y, 1M, 1C, and 1K starts forming an image in accordance with the command.

The image forming apparatus according to the exemplary embodiment further includes the following components as units for transporting paper sheets K: a paper tray 50 that contains paper sheets K; a paper feed roller 51 that draws and transports a paper sheet K stocked in the paper tray 50 at predetermined timings; transport rollers 52 that transport the paper sheet K drawn by the paper feed roller 51; a transport guide 53 with which the paper sheet K transported by the transport rollers 52 is fed into the second transfer section 20; a transport belt 55 that transports the paper sheet K that has been subjected to the second transfer with the second transfer roller 22 to the fixing unit 60; and a fixing entrance guide 56 with which the paper sheet K is introduced into the fixing unit 60.

A fundamental process for forming an image using the image forming apparatus according to the exemplary embodiment is described below.

In image forming apparatus according to the exemplary embodiment, image data sent from an image reading apparatus (not illustrated), a personal computer (PC, not illustrated), or the like are subjected to image processing using an image processing apparatus (not illustrated) and, subsequently, the image forming units 1Y, 1M, 1C, and 1K form images.

In the image processing apparatus, the input image data are subjected to image processing that includes various types of image editing, such as shading correction, misalignment correction, lightness/color space conversion, gamma correction, frame removal, color editing, and image moving. The image data that have been subjected to the image processing are converted into yellow, magenta, cyan, and black colorant gradation data and sent to the laser exposure machines 13.

In accordance with the colorant gradation data received by each of the laser exposure machines 13, the laser exposure machine 13 irradiates the photosensitive member 11 included in each of the image forming units 1Y, 1M, 1C, and 1K with an exposure beam Bm emitted from a semiconductor laser or the like. After the surface of the photosensitive member 11 of each of the image forming units 1Y, 1M, 1C, and 1K has been charged by the charger 12, the surface of the photosensitive member 11 is scanned by the laser exposure machine 13 and exposed to the beam and, consequently, an electrostatic latent image is formed on the surface of the photosensitive member 11. The electrostatic latent image is developed in each of the image forming units 1Y, 1M, 1C, and 1K as Y, M, C, or K toner image.

The toner images formed on the photosensitive members 11 of the image forming units 1Y, 1M, 1C, and 1K are transferred to the intermediate transfer belt 15 in the first transfer section 10 in which the photosensitive members 11 contact with the intermediate transfer belt 15. Specifically, in the first transfer section 10, the first transfer rollers 16 apply a voltage (first transfer bias) having a polarity opposite to the polarity (negative) of charged toner particles to the base of the intermediate transfer belt 15 and the toner images are sequentially superimposed on the surface of the intermediate transfer belt 15 (first transfer).

After the toner images have been sequentially first-transferred onto the surface of the intermediate transfer belt 15, the intermediate transfer belt 15 is moved and the toner images are transported to the second transfer section 20. When the toner images are transported to the second transfer section 20, in the transport unit, the paper feed roller 51 starts rotating and feeds a paper sheet K having an intended size from the paper tray 50 in synchronization with the transportation of the toner images to the second transfer section 20. The paper sheet K fed by the paper feed roller 51 is transported by the transport rollers 52 and reaches the second transfer section 20 through the transport guide 53. Before the paper sheet K reaches the second transfer section 20, the feeding of the paper sheet K is temporarily paused and an alignment between the paper sheet K and the toner images is made by an alignment roller (not illustrated) being rotated in synchronization with the movement of the intermediate transfer belt 15 on which the toner images are held.

In the second transfer section 20, the second transfer roller 22 is pressed by the backing roller 25 with the intermediate transfer belt 15 interposed between the second transfer roller 22 and the backing roller 25. The paper sheet K transported to the second transfer section 20 at the intended timing becomes inserted between the intermediate transfer belt 15 and the second transfer roller 22. Upon a voltage (i.e., second transfer bias) having a polarity that is the same as the polarity (negative) of charged toner particles being applied by the power supplying roller 26, a transfer electric field is generated between the second transfer roller 22 and the backing roller 25. The unfixed toner images held on the intermediate transfer belt 15 are electrostatically transferred to the paper sheet K collectively in the second transfer section 20, which is pressurized by the second transfer roller 22 and the backing roller 25.

The paper sheet K on which the toner images have been electrostatically transferred is subsequently removed from the intermediate transfer belt 15 and immediately transported by the second transfer roller 22 to the transport belt 55, which is disposed downstream of the second transfer roller 22 in the direction in which paper sheets are transported. The transport belt 55 transports the paper sheet K to the fixing unit 60 in accordance with the transportation speed optimum for the fixing unit 60. The unfixed toner images present on the paper sheet K transported to the fixing unit 60 are fixed to the paper sheet K by heat and pressure in the fixing unit 60. The paper sheet K on which the fixed image has been formed is transported to a paper eject tray (not illustrated) disposed in an ejecting section of the image forming apparatus.

Toner particles that remain on the intermediate transfer belt 15 after the termination of the transfer to the paper sheet K are transported to the cleaning section due to the rotation of the intermediate transfer belt 15 and removed from the intermediate transfer belt 15 by the cleaning backing roller 34 and the intermediate transfer belt cleaning member 35.

The exemplary embodiments are described above. It should be understood that the above-described exemplary embodiments are not restrictive, and many modifications, variations, and improvements may be made to the exemplary embodiments.

EXAMPLES

Examples of the exemplary embodiment of the present disclosure are described below. Note that, the exemplary embodiment of the present disclosure is not limited by Examples below. In the following description, "part" and "%" are all on a mass basis.

Example 1

Belt Main Body Preparation Step

A PI precursor solution is prepared by dissolving polyamic acid that is a polymer of 3,3',4,4'-biphenyltetracarboxylic dianhydride and 4,4'-diaminodiphenyl ether in N-methyl-2-pyrrolidone (NMP). The PI precursor solution used is a solution in which the solid content of a polyimide resin produced by imidization of the polyamic acid is 18% by mass.

Carbon black "FW200" produced by Orion Engineered Carbons S.A. (average particle size: 13 nm) is added to the PI precursor solution such that the amount of the carbon black is 19 parts by mass relative to 100 parts by mass of the solid content of the polyamic acid. The resulting mixture is stirred to form a carbon black-dispersed PI precursor solution.

The carbon black-dispersed PI precursor solution is ejected onto the outer surface of an aluminum cylindrical body through a dispenser at a width of 500 mm while the cylindrical body is rotated.

Subsequently, drying is performed by heating at 140° C. for 30 minutes while the cylindrical body is kept horizontal. Heating is performed for 120 minutes such that the maximum temperature is 320° C. The resulting belt main body (i.e., single-layer body consisting of a polyimide resin layer) having a thickness of 80 μm is cut to a width of 363 mm.

An intermediate transfer belt main body is prepared by the above-described process. Lubricant Composition Silica particles ("TGC-110" produced by CABOT, average size: 115 nm) and polyvinyl alcohol (PVA) "Polyvinyl Alcohol" produced by FUJIFILM Wako Pure Chemical Corporation, which serves as a binder, are used such that the amount of the polyvinyl alcohol relative to the amount of the silica particles is as described in Table 1. The above materials are subjected to the following treatment.

Preparation of Aqueous Polyvinyl Alcohol Solution

To 97 parts by mass of water, 3 parts by mass of polyvinyl alcohol (PVA) "Polyvinyl Alcohol" produced by FUJIFILM Wako Pure Chemical Corporation is gradually added while the water is stirred. Subsequent to the addition of PVA, the resulting liquid is heated to 95° C. while being stirred in order to dissolve PVA. Subsequent to the dissolution of PVA, the resulting solution is cooled to room temperature (22° C.) while being stirred. Hereby, an aqueous polyvinyl alcohol solution having a solid content of 3% is prepared.

Surface Treatment

The aqueous polyvinyl alcohol solution is sprayed to the silica particles such that the amount described in Table 1 is achieved in terms of solid content. Subsequently, air drying is performed at normal temperature (22° C.) for 24 hours. Hereby, the surfaces of the silica particles are treated with polyvinyl alcohol.

Molding of Lubricant Composition

The surface-treated silica particles are charged into a tablet forming die having a diameter of 13 mm and subsequently pressed with a hydraulic pump at a pressure of 30 MPa for 1 minute to form a molded body.

Hereby, a lubricant composition that includes solid lubricant particles and a binder disposed on the surfaces of the solid lubricant particles is prepared.

Examples 2 to 9 and Comparative Examples 1 to 5

Lubricant compositions are prepared as in Example 1, except that the type and average size of the inorganic compound particles used, the type of the binder used, and the amount of the binder added are changed as described in Table 1. The components listed in Table 1 are as described below.

Inorganic Compound Particles

- Silica particles "TGC-110" produced by CABOT, average size: 115 nm
- Silica particles "x24-9600A-80" produced by Shin-Etsu Chemical Co., Ltd., average particle size: 80 nm
- Silica particles "TG-5110" produced by CABOT, average size: 37 nm
- Silica particles "OSG-170" produced by Shin-Etsu Chemical Co., Ltd., average size: 170 nm
- Silica particles "43-17-502" produced by Corefront Corporation, average size: 500 nm
- Boron nitride particles "AP-100S" produced by MARUKA Corporation., Ltd, average size: 100 nm Binder

- Polyvinyl alcohol (PVA) "Polyvinyl Alcohol" produced by FUJIFILM Wako Pure Chemical Corporation
- Carboxymethyl cellulose (CMC) "KIMICA CMC" produced by KIMICA Corporation Evaluation Tests The formability of the lubricant composition is evaluated.

Furthermore, the lubricant composition is charged into a modification of an image forming apparatus "Versant 180 Press" produced by FUJIFILM Business Innovation Corp. which includes a lubricant feeding unit, and evaluations are made in terms of the adhesive force of a toner and transferability to embossed paper.

Formability

The formability of the lubricant composition is evaluated by the test described below.

The lubricant composition is freely dropped from a height of 50 mm, and the state of the lubricant composition is subsequently observed in order to determine the formability of the lubricant composition.

Evaluation Standards

- A (Excellent): The lubricant composition hardly loses its shape, and chips, cracks, or the like are absent in the surface of the lubricant composition.
- B (Good): The lubricant composition hardly loses its shape, but chips, cracks, or the like are present in the surface of the lubricant composition.
- C (Poor): The lubricant composition loses its shape or collapses.
- D (Bad): The lubricant composition cannot be formed into a molded body and remains in a powdery form.

Non-Electrostatic Adhesive Force of Toner

The adhesive force of a toner to the intermediate transfer belt is determined in early stages of image formation (i.e., when images are formed on 10 sheets) and after a lapse of time (i.e., when images are formed on 1,000 sheets; maintenance of the adhesive force).

The adhesive force of a toner is determined by the following method.

The adhesive force of a toner is the pressure (unit: MPa) at which, when polyester resin particles having a volume average size of 4.7 μm are adhered on the outer peripheral surface of the intermediate transfer belt at a load of 46 g/cm$^2$ and air is blown onto the outer peripheral surface from the above of the outer peripheral surface while the pressure at which the air is blown onto the outer peripheral surface is increased, all the polyester resin particles adhered on the outer peripheral surface detach from the outer peripheral surface.

Transferability to Embossed Paper

A Blue halftone image having an image density of 30% is formed on 1,000 embossed paper sheets ("Bossyuki"). Whether the recesses are filled with the image is visually inspected in early stages (i.e., when images are formed on 10 sheets) and after a lapse of time (i.e., when images are formed on 1,000 sheets; maintenance of the transferability). Comparisons are made between the first and tenth images and between the first and one-thousandth images in order to evaluate transferability. The evaluation standards are as follows.

- A+ (Excellent+): Missing parts are absent at the recesses as in the first image.
- A (Excellent): The image does not change compared with the first image, and missing parts are slightly present at the recesses.
- B (Good): Missing parts formed at the recesses are slightly increased compared with the first image.
- C (Poor): Missing parts formed at the recesses are considerably increased by a degree worse than B (Good) compared with the first image and are at inacceptable levels.
- D (Bad): Missing parts formed at the recesses are further considerably increased by a degree worse than C (Poor) compared with the first image.

TABLE 1

| | | Inorganic compound particle | | Binder | | | Evaluations | | |
|---|---|---|---|---|---|---|---|---|---|
| | | Type | Average particle size (nm) | Type | Amount added (mass %) | Martens hardness (N/mm$^2$) | Formability | Non-electrostatic adhesive force of toner | Transferability to embossed paper |
| Example | 1 | Silica | 115 | PVA | 0.01 | 8 | A (Excellent) | 6 | A (Excellent) |
| | 2 | Silica | 115 | PVA | 0.50 | 7 | A (Excellent) | 5 | A (Excellent) |
| | 3 | Silica | 115 | PVA | 1.00 | 9 | A (Excellent) | 6 | A (Excellent) |
| | 4 | Silica | 115 | PVA | 10.00 | 5 | B (Good) | 5 | A (Excellent) |
| | 5 | Silica | 115 | PVA | 20.00 | 4 | B (Good) | 5 | B (Good) |
| | 6 | Silica | 80 | PVA | 1.00 | 9 | A (Excellent) | 6 | A (Excellent) |
| | 7 | Silica | 37 | PVA | 1.00 | 9 | A (Excellent) | 6 | A (Excellent) |
| | 8 | Silica | 115 | CMC | 10.00 | 5 | B (Good) | 6 | A (Excellent) |
| | 9 | boron nitride | 100 | PVA | 0.50 | 4 | B (Good) | 8 | B (Good) |

TABLE 1-continued

| | | Inorganic compound particle | | Binder | | | Evaluations | | |
|---|---|---|---|---|---|---|---|---|---|
| | | Type | Average particle size (nm) | Type | Amount added (mass %) | Martens hardness ($N/mm^2$) | Formability | Non-electrostatic adhesive force of toner | Transferability to embossed paper |
| Comparative Example | 1 | Silica | 115 | PVA | 30.00 | 2 | D (Bad) | 6 | B (Good) |
| | 2 | Silica | 115 | PVA | 23.00 | 3 | C (Poor) | 6 | B (Good) |
| | 3 | Silica | 115 | — | 0.00 | — | C (Poor) | 6 | A (Excellent) |
| | 4 | Silica | 500 | PVA | 1.00 | 12 | A (Excellent) | 13 | D (Bad) |
| | 5 | Silica | 170 | PVA | 1.00 | 10 | A (Excellent) | 11 | C (Poor) |

The above results confirm that the lubricant compositions prepared in Examples are capable of being fed to an intermediate transfer belt in a suitable manner with consistency and may enhance the transferability of a toner from an intermediate transfer belt to a paper sheet having irregularities compared with the lubricant compositions prepared in Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A lubricant composition fed to an intermediate transfer belt in an intermediate transfer-type electrophotographic image forming method, the lubricant composition including:

solid lubricant particles that are inorganic compound particles having an average size of 120 nm or less; and a binder disposed on surfaces of the solid lubricant particles, wherein a content of the binder is 0.01% by mass or more and 20.00% by mass or less of an amount of the lubricant composition.

(((2))) The lubricant composition according to (((1))), wherein the average size of the inorganic compound particles is 115 nm or less.

(((3))) The lubricant composition according to (((1))) or (((2))), wherein the average size of the inorganic compound particles is 20 nm or more.

(((4))) The lubricant composition according to (((3))), wherein the average size of the inorganic compound particles is 30 nm or more.

(((5))) The lubricant composition according to any one of (((1))) to (((4))), wherein the content of the binder is 0.10% by mass or more and 15.00% by mass or less of the amount of the lubricant composition.

(((6))) The lubricant composition according to any one of (((1))) to (((5))), wherein the binder is a water-soluble binder.

(((7))) The lubricant composition according to (((6))), wherein the binder is polyvinyl alcohol.

(((8))) The lubricant composition according to any one of (((1))) to (((7))), wherein the inorganic compound particles are silica particles.

(((9))) The lubricant composition according to any one of (((1))) to (((8))), having a Martens hardness of 3 $N/mm^2$ or more and 30 $N/mm^2$ or less.

(((10))) The lubricant composition according to (((9))), having a Martens hardness of 4 $N/mm^2$ or more and 20 $N/mm^2$ or less.

(((11))) A transfer device including:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to any one of (((1))) to (((10))) onto the surface of the intermediate transfer belt.

(((12))) An image forming apparatus including:

a toner image formation device including an image holding member, the toner image formation device forming a toner image on a surface of the image holding member; and a transfer device that transfers the toner image formed on the surface of the image holding member onto a surface of a recording medium, the transfer device being the transfer device according to (((11))).

What is claimed is:

1. A lubricant composition fed to an intermediate transfer belt in an intermediate transfer-type electrophotographic image forming method, the lubricant composition comprising:

solid lubricant particles that are inorganic compound particles having an average size of 120 nm or less; and a binder disposed on surfaces of the solid lubricant particles, wherein a content of the binder is 0.01% by mass or more and 20.00% by mass or less of an amount of the lubricant composition.

2. The lubricant composition according to claim 1, wherein the average size of the inorganic compound particles is 115 nm or less.

3. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 2 onto the surface of the intermediate transfer belt.

4. The lubricant composition according to claim 1, wherein the average size of the inorganic compound particles is 20 nm or more.

5. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 3 onto the surface of the intermediate transfer belt.

6. The lubricant composition according to claim 4, wherein the average size of the inorganic compound particles is 30 nm or more.

7. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 4 onto the surface of the intermediate transfer belt.

8. The lubricant composition according to claim 1, wherein the content of the binder is 0.10% by mass or more and 15.00% by mass or less of the amount of the lubricant composition.

9. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 5 onto the surface of the intermediate transfer belt.

10. The lubricant composition according to claim 1, wherein the binder is a water-soluble binder.

11. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 6 onto the surface of the intermediate transfer belt.

12. The lubricant composition according to claim 10, wherein the binder is polyvinyl alcohol.

13. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 7 onto the surface of the intermediate transfer belt.

14. The lubricant composition according to claim 1, wherein the inorganic compound particles are silica particles.

15. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 8 onto the surface of the intermediate transfer belt.

16. The lubricant composition according to claim 1, having a Martens hardness of 3 $N/mm^2$ or more and 30 $N/mm^2$ or less.

17. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 9 onto the surface of the intermediate transfer belt.

18. The lubricant composition according to claim 16, having a Martens hardness of 4 $N/mm^2$ or more and 20 $N/mm^2$ or less.

19. A transfer device comprising:

an intermediate transfer belt having a surface onto which a toner image is transferred;

a first transfer unit including a first transfer member that transfers a toner image formed on a surface of an image holding member onto the surface of the intermediate transfer belt as first transfer;

a second transfer unit including a second transfer member arranged to contact with the surface of the intermediate transfer belt, the second transfer member transferring the toner image transferred on the surface of the intermediate transfer belt onto a surface of a recording medium as second transfer;

a cleaning unit including a cleaning blade that cleans the surface of the intermediate transfer belt; and a lubricant feeding unit arranged to contact with the surface of the intermediate transfer belt, the lubricant feeding unit feeding the lubricant composition according to claim 1 onto the surface of the intermediate transfer belt.

20. An image forming apparatus comprising:

a toner image formation device including an image holding member, the toner image formation device forming a toner image on a surface of the image holding member; and a transfer device that transfers the toner image formed on the surface of the image holding member onto a surface of a recording medium, the transfer device being the transfer device according to claim 19.

* * * * *